US012138728B2

(12) United States Patent
Haltmeyer et al.

(10) Patent No.: US 12,138,728 B2
(45) Date of Patent: Nov. 12, 2024

(54) MACHINE TOOL HAVING A GANTRY

(71) Applicant: CHIRON Group SE, Tuttlingen (DE)

(72) Inventors: Tobias Haltmeyer, Radolfzell (DE); Karl-Heinz Raffke, Aldingen (DE); Daniel Gems, Talheim (DE); Claus Eppler, Messstetten (DE)

(73) Assignee: CHIRON Group SE, Tuttlingen (DE)

( * ) Notice: Subject to any disclaimer, the term of this patent is extended or adjusted under 35 U.S.C. 154(b) by 493 days.

(21) Appl. No.: 17/453,519

(22) Filed: Nov. 4, 2021

(65) Prior Publication Data

US 2022/0055163 A1 Feb. 24, 2022

Related U.S. Application Data

(63) Continuation of application No. PCT/EP2020/062599, filed on May 6, 2020.

(30) Foreign Application Priority Data

May 7, 2019 (DE) ...................... 10 2019 111 873.5

(51) Int. Cl.
B23Q 3/157 (2006.01)
B23Q 1/01 (2006.01)
(Continued)

(52) U.S. Cl.
CPC ......... *B23Q 3/15706* (2013.01); *B23Q 1/012* (2013.01); *B23Q 1/015* (2013.01);
(Continued)

(58) Field of Classification Search
CPC .......... B23Q 1/01; B23Q 1/012; B23Q 1/015; B23Q 1/017; B23Q 3/15724;
(Continued)

(56) References Cited

U.S. PATENT DOCUMENTS 8,123,204 B2 * 2/2012 Bernhard ........... B23Q 11/0092
409/168
10,322,484 B2 6/2019 Geissler et al.
(Continued)

FOREIGN PATENT DOCUMENTS

AT 520288 A4 3/2019
CH 706794 B1 * 2/2014 ............. B23Q 1/626
(Continued)

OTHER PUBLICATIONS

EPO Machine Translation of DE102017122439A1—Capelle, Claude; "Machine Tool with Vertical Spindle"; Sep. 27, (Year: 2018).*
(Continued)

*Primary Examiner* — Sunil K Singh
*Assistant Examiner* — Michael Vitale
(74) *Attorney, Agent, or Firm* — Jason H. Vick; Womble Bond Dickinson (US) LLP

(57) ABSTRACT

A machine tool comprises a frame, which carries a fixed gantry for supporting at least one tool spindle. The gantry comprises a gantry recess, through which a working space is accessible. The one or more tool spindles on the gantry can each be moved vertically in a first direction and in a second direction orthogonal to the first direction. The machine tool further comprises a workpiece table with at least one location for supporting workpieces. The workpiece table is movable in translation in a third direction Y orthogonal to the first direction and the second direction. At least one tool magazine is associated with the at least one tool spindle tool spindle. Tools for tool changing can be fed through at least one magazine opening in the gantry. Tool changing between the one or more tool spindles and the at least one tool magazine takes place in a pick-up process.

28 Claims, 7 Drawing Sheets

(51) Int. Cl.
*B23Q 1/48* (2006.01)
*B23Q 39/00* (2006.01)

(52) U.S. Cl.
CPC ....... *B23Q 1/4857* (2013.01); *B23Q 3/15724* (2016.11); *B23Q 3/15766* (2013.01); *B23Q 2039/002* (2013.01); *Y10T 409/309576* (2015.01); *Y10T 483/16* (2015.01); *Y10T 483/1795* (2015.01); *Y10T 483/1845* (2015.01); *Y10T 483/1891* (2015.01)

(58) Field of Classification Search
CPC .............. B23Q 3/15753; B23Q 3/1576; B23Q 3/15766; B23Q 2039/002; B23C 1/08; Y10T 408/91; Y10T 409/307168; Y10T 409/307784; Y10T 409/308344; Y10T 409/308568; Y10T 409/307728; Y10T 409/308288; Y10T 409/309576; Y10T 409/309632; Y10T 483/1873; Y10T 483/1882; Y10T 483/1891
USPC ....... 409/192, 202, 203, 212, 213, 217, 235, 409/236; 408/234; 483/56, 66, 67, 68
See application file for complete search history.

(56) References Cited

U.S. PATENT DOCUMENTS

| | | | |
|---|---|---|---|
| 2004/0102297 A1 | 5/2004 | Quak et al. | |
| 2006/0269375 A1 | 11/2006 | Takayama et al. | |
| 2008/0175684 A1 | 7/2008 | Schmidt et al. | |
| 2010/0313718 A1* | 12/2010 | Meidar | B23Q 1/015 82/122 |
| 2016/0221118 A1* | 8/2016 | Yamashita | B23K 26/0608 |
| 2019/0193218 A1* | 6/2019 | Bauer | B23Q 1/4852 |
| 2020/0001417 A1* | 1/2020 | Saeufferer | B23Q 39/04 |

FOREIGN PATENT DOCUMENTS

| | | | | |
|---|---|---|---|---|
| CN | 201350515 Y | | 11/2009 | |
| CN | 101870063 A | * | 10/2010 | |
| CN | 105458358 A | | 4/2016 | |
| CN | 104440394 B | | 9/2016 | |
| CN | 108655472 A | | 10/2018 | |
| CN | 113400100 A | * | 9/2021 | ............. B23Q 1/626 |
| DE | 10049810 A1 | | 4/2002 | |
| DE | 202008005773 U1 | | 7/2008 | |
| DE | 102009025009 A1 | | 12/2010 | |
| DE | 102016201016 A1 | | 7/2017 | |
| DE | 102017122439 A1 | | 4/2018 | |
| EP | 1882544 A1 | | 1/2008 | |
| EP | 2082831 A1 | | 7/2009 | |
| EP | 2210723 A1 | * | 7/2010 | ............... B27C 9/00 |
| EP | 2842705 A1 | | 3/2015 | |
| EP | 2992994 A1 | | 3/2016 | |
| JP | 2008105158 A | * | 5/2008 | |
| JP | 2010-052068 A | | 3/2010 | |

OTHER PUBLICATIONS

International Search Report for International Application No. PCT/EP2020/062599, mailed Aug. 3, 2020.
Written Opinion for International Application No. PCT/EP2020/062599, mailed Aug. 3, 2020.
Office Action for corresponding German Patent Application No. 10 2019 111 873.5, mailed Mar. 9, 2020.
International Preliminary Report on Patentability for International Application No. PCT/EP2020/062599, mailed Nov. 18, 2021.

* cited by examiner

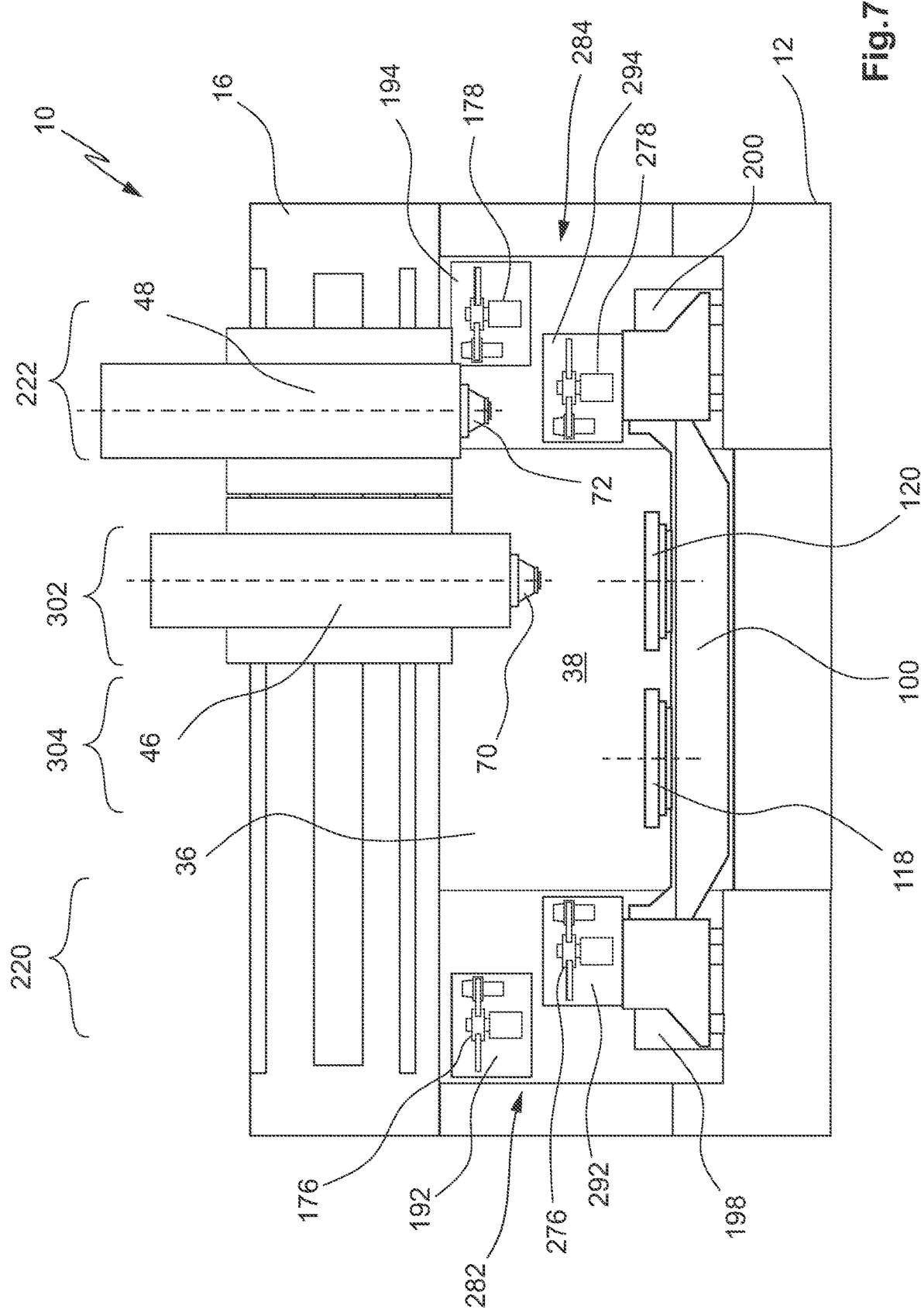

MACHINE TOOL HAVING A GANTRY

CROSS-REFERENCE TO RELATED APPLICATIONS

This application is a continuation of international patent application PCT/EP2020/062599, filed on May 6, 2020 and designating the U.S., which international patent application has been published in German language and claims priority to national German patent application 10 2019 111 873.5, filed on May 7, 2019. The entire contents of these priority applications are incorporated herein by reference.

BACKGROUND

The present disclosure relates to a machine tool having a frame supporting a fixed gantry for supporting at least one tool spindle, the gantry having a gantry recess, through which a working space is accessible, the or each tool spindle being movable on the gantry in a respective first direction vertical and a respective second direction orthogonal to the first direction, and a workpiece table having at least one location for supporting workpieces, wherein the workpiece table is translationally movable in a third direction orthogonal to the first direction and the second direction.

From US 2008/0175684 A1, such a machine tool is known, with a machine frame, which has two parallel side walls and an upper cross member, which is fixed on the two side walls, with a machining unit, which can be moved by motor in at least two coordinate axes, which includes a rotationally driven work spindle with interchangeable tools, and with a front structure, which has two transversely spaced horizontal guide rails, on which a workpiece table arrangement with a table plate for clamping a workpiece is arranged so as to be movable by motor in a horizontal coordinate axis.

The known machine tool allows multi-axis machining, wherein in addition to three translational axes, two further swivel axes are available. In this way, various machining operations can be carried out.

From DE 10 2017 122 439 A1 a similar machine tool in gantry design is known. The machine tool comprises two tool magazines arranged centrally behind the gantry and tool changers associated therewith, which transfer tools through the main opening of the gantry between the tool magazines and a respective change position.

From US 2004/0102297 A1, a machine tool is known, in which a workpiece carrier can be moved vertically on a vertical column and has a horizontal axis of rotation for the workpiece. At least one tool spindle with horizontal orientation is provided, which is movable on a transverse beam of a gantry parallel to the horizontal axis of rotation of the workpiece carrier. The column for the workpiece carrier and the gantry for the at least one tool spindle together form a frame. Between a vertical guide of the workpiece carrier and a horizontal guide of the tool spindle, a slot-like recess is provided in the frame, in which a tool magazine is arranged in vertical orientation with horizontally aligned tools. The tools enter the working area between the tool spindle and the workpiece carrier.

In the field of machine tools, an improvement in efficiency and/or productivity is regularly demanded. However, this should not be at the expense of machining accuracy and process reliability. Furthermore, machining should be as highly automated as possible, including, for example, a partially automated or automated workpiece change and a partially automated or automated tool change.

Furthermore, there are a wide variety of machining tasks, so that on the one hand a machine tool is usable as universally as possible. On the other hand, there are demands for specific machines that can perform specific machining tasks with high efficiency. Furthermore, there is often a conflict of goals between the universal suitability of the machine tool for components of different geometries with considerable dimensions, the achievable maximum accuracy and productivity. For example, an increase in the work space for machining larger components is often accompanied by an increase in the traverse paths, so that the rigidity would possibly deteriorate without additional measures.

In view of this, it is an object of the present disclosure to provide a machine tool for machining workpieces, which enables at least partially automated multi-axis machining in a processing space of at least medium size.

It is a further object of the present disclosure to present a machine tool, which enables, in this context, high performance machining and short non-productive times.

It is a further object of the present disclosure to present a machine tool, which is suitable for machining structural components, for example for machining loadbearing car body components or similar components subjected to loads during operation.

It is a further object of the present disclosure to present a machine tool, which is arranged as a double spindle machine for parallel use of two tool spindles.

It is a further object of the present disclosure to present a machine tool, which allows parallel machining of two workpieces to increase productivity.

It is a further object of the present disclosure to present a machine tool, which allows a fully automatic tool change.

It is a further object of the present disclosure to present a machine tool, which allows a fully automatic workpiece change.

It is a further object of the present disclosure to present a machine tool, which provides an easily accessible working space with as little obstruction as possible.

It is yet a further object of the present disclosure to present a machine tool, which provides a considerably large working space for machining for a given total vol-ume and/or footprint.

SUMMARY

According to a first aspect, these and other objects are achieved by A machine tool, comprising
 a frame,
 a fixed gantry, which is supported by the frame, for supporting one or more tool spindles,
 a workpiece table having at least one workpiece support location for supporting workpieces,
 one of more tool magazines associated with the one or more tool spindles,
 a gantry recess formed in the gantry, through which a working space is accessible,
 wherein the one or more tool spindles at the gantry can each be moved vertically in a first direction and in a second direction orthogonal to the first direction,
 wherein the workpiece table is translationally movable in a third direction orthogonal to the first direction and the second direction,
 wherein tools for tool changing can be fed through at least one magazine opening that is provided in addition to the gantry recess in the gantry, and wherein the tool change between the one or more tool spindles and the one of more tool magazines takes place in a pick-up process.

According to a further aspect, there is presented a machine tool comprising a frame supporting a fixed gantry for supporting at least one tool spindle, the gantry having a gantry recess, through which a working space is accessible, the or each tool spindle being movable on the gantry respectively in a first direction (Z-direction) vertically and in a second direction (X-direction) orthogonal to the first direction, and having a workpiece table with at least one space for supporting workpieces, wherein the workpiece table can be moved in translation in a third direction (Y-direction) orthogonal to the first direction and the second direction, wherein at least one tool magazine is associated with the or each tool spindle, wherein tools for tool changing can be fed through at least one magazine opening, and wherein tool changing between the or each tool spindle and the at least one tool magazine takes place in a pick-up process.

In certain embodiments, each tool spindle is associated with, for example adjacent to, a magazine with tool locations for tool changing. The adjacent arrangement allows the tool spindle to pick up tools from the magazine directly in the pick-up process and to deliver tools to the magazine. The traverse paths for the tool spindle required for this are sufficiently short, so that non-productive times can be reduced. Furthermore, the direct, immediate transfer of tools between the at least one tool spindle and the magazine makes it possible to dispense with separate handling technology and drives required for this purpose. In certain embodiments, this may have the result that the available working space is actually available to a large extent for machining. Furthermore, the elimination of additional handling technology, etc. for the tool change reduces the effort required for controlling the tool change process. Another result is the reduced effort for cleaning (chips, coolant, etc.), at least in certain embodiments.

The at least one magazine opening is provided in the gantry in addition to the gantry opening, at least in exemplary embodiments. Exemplary embodiments with two tool spindles result in a gantry with a central gantry opening and two magazine openings arranged laterally thereof. In this exemplary embodiment, the gantry opening is arranged between the two magazine openings. Accordingly, designs are conceivable, in which the magazine openings do not directly couple to the working area. Instead, a tool change area can be implemented outside the working space so that the working space is not affected. In certain embodiments, a result of this configuration is that during machining in the working space, the tool change area can be used for providing or removing tools. Accordingly, in exemplary embodiments, the tool change area is formed laterally of the actual working space. In the configuration with two tool spindles, a first changing area is arranged on the left and a second changing area is arranged on the right of the working area. This is not to be understood to be limiting.

According to the above aspect, the gantry provides at least one magazine opening, through which the tools can be supplied and removed. If at least one magazine opening for tool change is provided next to the gantry recess, then the actual gantry recess can be used for other purposes. Furthermore, there is a clear view and better access through the gantry recess to the working area. In certain embodiments, a result is the separation between tool change (through the magazine opening) and another access (gantry recess) to the working area.

According to a further aspect, the above and other objects are achieved by a machine tool, comprising
a frame,
a fixed gantry, which is supported by the frame, for supporting one or more tool spindles,
a workpiece table having at least one workpiece support location for supporting workpieces,
one of more tool magazines associated with the one or more tool spindles,
a gantry recess formed in the gantry, through which a working space is accessible,
wherein the one or more tool spindles at the gantry can each be moved vertically in a first direction and in a second direction orthogonal to the first direction,
wherein the workpiece table is translationally movable in a third direction orthogonal to the first direction and the second direction,
wherein a tool change between the one or more tool spindles and the one of more tool magazines takes place in a pick-up process,
wherein the workpiece table is pivotable about an axis parallel to the second direction, and
wherein two drives that are mutually spaced and jointly controlled are provided for any of the translatory movement and the pivoting movement of the workpiece table.

According to a further aspect, there is presented a machine tool comprising a frame supporting a fixed gantry for supporting at least one tool spindle, the gantry having a gantry recess, through which a working space is accessible, the or each tool spindle being movable on the gantry in a first direction (Z-direction) vertically and in a second direction (X-direction) orthogonal to the first direction, respectively, and having a workpiece table with at least one location for supporting workpieces, wherein the workpiece table can be moved in translation in a third direction (Y-direction) orthogonal to the first direction and the second direction, wherein the workpiece table can be pivoted about an axis (A-axis) parallel to the second direction (X-direction), and wherein two mutually spaced, jointly controlled drives are provided in each case both for the translational movement and for the pivoting movement of the workpiece table.

In certain embodiments, the provision of two drives spaced apart from one another both for the translatory movement of the workpiece table and for the rotatory movement of the workpiece table permits a sufficiently high and reproducible accuracy even with considerable dimensions of the table, even with large workpieces. Furthermore, higher accelerations and maximum speeds can result for the translatory movement and the swivel movement. If two drives spaced apart from each other are provided, certain load situations can be detected by control technology. At least in exemplary embodiments, this can be done without separate sensors if characteristic values of the drives are monitored. In an exemplary embodiment, the current consumption of the drives is monitored. In this way, different loads on the two drives can be easily determined. If, for example, there is a considerable asymmetry, one may react thereto in terms of control technology.

It is understood that the two aspects mentioned above can be combined with each other, but can also be implemented independently.

According to an exemplary embodiment, a first tool spindle and a second tool spindle are arranged on the gantry, wherein the workpiece table has a first location for supporting workpieces and a second location for supporting workpieces, wherein the first location is associated with the first tool spindle, and wherein the second location is associated with the second tool spindle. Exemplarily, the workpiece table is configured as a cradle extending between two pivot bearings defining the pivot axis (A-axis) parallel to the second direction (X-axis).

According to this embodiment, the frame with the gantry has a sufficiently large extension in the second direction (X-direction) so that two workpiece holders (such as pallets or the like) can be arranged on the tool table. Since the gantry now supports two tool spindles, which are arranged next to each other and offset from each other in the second direction, two workpieces can be machined simultaneously. This increases productivity.

According to an exemplary embodiment, the first tool spindle and, if present, the second tool spindle each have a vertically oriented spindle axis (parallel to the Z-direction). The tool spindles comprise a tool holder. The tool holder and a tool attached thereto can be rotationally driven about the spindle axis of the respective spindle.

According to another exemplary embodiment, the first tool spindle and the second tool spindle are movable together and synchronously in the second direction (X-direction), wherein a spindle distance is adapted to a distance between the first workpiece support location and the second workpiece support location. In other words, in this operating mode, the two tool spindles are operated to have a fixed spindle distance therebetween, which does not change when the tool spindles are moved in the X-direction. In this way, two components arranged on the workpiece fixtures on the workpiece table can be machined identically or nearly identically. The two tool spindles can be coupled to each other in terms of control. At least in exemplary embodiments, this does not comprise a fixed mechanical coupling.

According to an exemplary embodiment, the first tool spindle and the second tool spindle are mounted on a common horizontal guide so as to be movable in the second direction. By way of example, the first tool spindle and the second tool spindle use a common linear drive, for instance a linear direct drive. According to an exemplary embodiment, the two tool spindles use one and the same primary part.

In certain embodiments, the coupling "in terms of control" of the first tool spindle and the second tool spindle in the second direction (X-direction) results in the two tool spindles being movable independently of each other and relative to each other in the second direction if required. This is used in certain operating modes, such as for tool change. In certain embodiments, the two tool spindles can be moved together as a package in the coupled state.

According to a further exemplary embodiment, the at least one tool magazine extends, at least sectionally, into the magazine opening in the gantry. In this way, the magazine can be loaded from the side of the gantry facing away from the working space. The magazine can be loaded manually or automatically. According to a further exemplary embodiment, the at least one tool magazine extends through the magazine opening.

According to a further exemplary embodiment, the at least one tool magazine is located in a tool change area outside the working space, wherein the at least one tool spindle is movable between a working position in the working space and a tool changing position in the tool change area. Accordingly, the tool spindle can be moved back and forth between a working area in the working space and the tool change area. Typically, this comprises a movement in the second direction (X-direction). According to an exemplary embodiment, a partition wall/intermediate wall is provided between the working area and the tool change area, wherein the tool spindle can pass over and/or around the partition wall for tool changing.

According to another exemplary embodiment, the machine tool comprises a first tool magazine in a first tool change area and a second tool magazine in a second tool change area, wherein the working area is arranged between the first tool change area and the second tool change area. In the working space, in the configuration with two tool spindles, a first area for the first tool spindle and a second area for the second tool spindle are provided. For tool change, the (control-wise) fixed coupling between the two spindles can be removed. The first and second tool spindles can be moved away from each other so that the first tool spindle can be moved into the first tool change area and the second tool spindle can be moved into the second tool change area.

According to a further exemplary embodiment, the first tool spindle and the second tool spindle, when using a first tool spindle and a second tool spindle, are movable independently of each other in the second direction for tool changing, wherein the first tool spindle is movable between the working space and the first tool change area, and wherein the second tool spindle is movable between the working space and the second tool change area.

According to a further exemplary embodiment, the or each tool spindle is vertically movable in the tool change area in order to change a machining tool, wherein at least one tool location of the at least one tool magazine for the associated tool spindle is vertically accessible from above. In this way, the tools can be transferred directly between the magazine and the tool spindle in a pick-up process without additional handling technology. In this way, tools can be removed from loaded tool locations through a tool holder of the tool spindle. Furthermore, the tool holder can deliver a previously clamped tool to an empty tool location. This takes place in a change position of the tool spindle in the change area.

According to a further exemplary embodiment, the at least one tool magazine is arranged as a chain magazine. A chain magazine is exemplarily arranged as a circulating chain with chain links, which have or support tool locations with receptacles for tools. The chain magazine comprises at least one drive, via which a currently selected tool location in the chain can be moved into a position (Y-position) suitable for transferring the tool. By way of example, at least in the case of a strand that is adjacent to the working space, the chain has a main extension direction, which is parallel to the third direction (Y-direction). In this way, the at least one chain magazine can extend laterally adjacent to the working space. Adjacent to the working space, in an exemplary embodiment, are a first chain magazine and a second chain magazine, with the working space extending therebetween.

In another exemplary embodiment, the first tool magazine is arranged above a first longitudinal guide for the workpiece table, wherein the second tool magazine is arranged above a second longitudinal guide. In this way, the installation space above the longitudinal guides for the workpiece table extending in the third direction (Y-direction) is used for the tool magazines. Overall, this contributes to a compact design. A large working space can be provided for given outer dimensions.

According to a further exemplary embodiment, the at least one tool magazine forms, together with a further tool magazine arranged in the same tool change area, a magazine arrangement with two magazines, which are offset relative to one another in such a way that each of the two magazines of the magazine arrangement is accessible for the associated tool spindle.

In other words, the two magazines of the arrangement are arranged on the same side of the working space adjacent thereto. It will be understood that another such magazine arrangement may be arranged on the opposite side of the working space. Within the magazine arrangement, the two magazines are vertically and horizontally offset from each other, at least sectionally. In this way, a first tool change position for the first tool magazine and a second tool change position for the second tool magazine are provided for the tool spindle in the tool change area.

According to an exemplary embodiment, the magazine arrangement comprises, with respect to the working space, an upper magazine and a lower magazine, the lower magazine being offset from the upper magazine in the direction towards the working space. The two tool magazines are offset from each other in the first direction (Z-direction) and the second direction (X-direction). In this way, the two tool magazines of the magazine arrangement are offset from each other in a terrace-like manner, so that it is still possible to transfer tools between the tool magazines and the tool spindle in the pick-up process.

According to another exemplary embodiment, the gantry comprises a magazine opening for each magazine arrangement. Accordingly, the magazine opening is configured to be large enough to allow both tool magazines of the magazine arrangement to extend, at least sectionally, into the magazine opening. According to an alternative embodiment, the gantry comprises two magazine openings for each magazine arrangement, a first one of which is associated with the first tool magazine and a second one of which is associated with the second tool magazine. Provided that access to the tool magazines is possible via one or both magazine openings, the magazines can be loaded directly or indirectly from the side of the gantry facing away from the working space.

According to a further exemplary embodiment, the two drives for the translatory movement of the workpiece table are controlled synchronously. According to a further exemplary embodiment, the two drives for the swivel movement of the workpiece table are controlled synchronously. Accordingly, both the translatory drive and the swivel drive for the tool table may be configured according to the moving gantry principle. This results in better symmetry compared to driven axes, in which only one drive (motor) acts on an element mounted on two bearings or guides. This can result in higher dynamics and greater precision. Furthermore, the installation space between the drives can remain free, but still a favorable, symmetrical force transmission results.

According to a further exemplary embodiment, the workpiece table is mounted on a first pivot bearing and a second pivot bearing spaced therefrom, the workpiece table extending therebetween as a cradle, and the first drive being associated with the first pivot bearing as a first swivel drive and the second drive being associated with the second pivot bearing as a second swivel drive. By way of example, the two swivel drives are each configured as a direct drive.

According to a further exemplary embodiment, the workpiece table is mounted on a first longitudinal guide and a second longitudinal guide spaced therefrom, with the workpiece table extending therebetween, and with a first linear drive being associated with the first longitudinal guide and a second linear drive being associated with the second longitudinal guide. The linear drive may be a linear motor, for example a linear direct drive. Other designs are conceivable, such as screw drives, etc.

Each of the two longitudinal guides supports a carriage, with the workpiece table, which is exemplarily configured as a cradle, extending between the two carriages. Accordingly, the two carriages each support a pivot bearing for the workpiece table. According to an exemplary embodiment, the two carriages each accommodate a swivel drive for the swivel movement (A-axis) of the workpiece table. According to a further exemplary embodiment, the two carriages accommodate—at least partially—a linear drive for the translatory movement of the workpiece table in the third direction (Y-axis).

According to an exemplary arrangement, the workpiece table hangs freely between the two carriages. According to this arrangement, no central support is provided. In certain embodiments, a central area of the working space is free at the bottom, so that, for example, the chip removal and the discharge of cooling lubricants can be improved. The tendency to contamination is reduced.

According to another exemplary embodiment, side struts extend between the gantry and the frame, between which the first longitudinal guide and the second longitudinal guide for the workpiece table are arranged. The longitudinal guides are arranged adjacent to the side struts. By way of example, the side struts may provide a connection between the gantry and the frame extending in the third direction (Y-direction). This increases the rigidity of the machine tool.

According to another exemplary embodiment, the side struts include a first node with a spindle side of the gantry and a second node with a support side of the frame. Accordingly, this embodiment comprises a vertically extending coupling between the side struts and the gantry and a horizontally extending coupling between the side struts and the frame.

According to another exemplary embodiment, the side struts each couple to the frame at a raised side profile thereof. By way of example, the side profiles have a Z dimension and a Y dimension, each greater than the X dimension.

According to another exemplary embodiment, the frame has two raised side profiles, which are raised in the first direction (Z-direction) relative to a guide support and/or relative to guide rails of the longitudinal guides for the workpiece table on the frame. The side profiles increase the rigidity of the frame. The two longitudinal guides are arranged between the two side profiles. The working space is formed between the two longitudinal guides.

According to a further exemplary embodiment, the workpiece table has two rotary tables, which are offset relative to one another and driven and whose axis of rotation is perpendicular to the swivel axis of the workpiece table, the first tool spindle being associated with a first rotary table and the second tool spindle being associated with a second rotary table. The rotary axes of the rotary tables may also be referred to as C-axes. In this exemplary embodiment, the rotary axes of the rotary tables are perpendicular to the A-axis. It will be understood that configurations with only one rotatable rotary table are also conceivable.

According to a further exemplary embodiment, the first tool spindle and the second tool spindle are movable in the second direction (X-direction) on the gantry in such a way that the first tool spindle, departing from its primary working position with assignment to the first rotary table, is movable in the direction towards the second rotary table into a secondary working position when the second tool spindle is moved away from the second rotary table. Alternatively or additionally, it is conceivable that the second tool spindle, departing from its primary working position with association to the second rotary table, is movable towards the first rotary table into a secondary working position when the first tool spindle is moved away from the first rotary table.

With this arrangement, it is possible for the first tool spindle to machine a workpiece on the second rotary table when the second tool spindle is in a park position or tool change position. In principle, a configuration is also conceivable, in which only a single tool spindle is supported at the gantry and can approach both rotary tables. In this way, the variety of functions is increased. The machine tool is suitable for a wider range of applications.

According to an exemplary embodiment, at least the first tool spindle or the second tool spindle can be moved departing from their primary working position in the secondary working position in the second direction (X-direction) to a position beyond the respective axis of rotation of the other rotary table associated in the secondary working position. In other words, it is conceivable to move the first tool spindle to an X-position, in which the X-position of the axis of rotation of the second rotary table lies between the X-position of the axis of rotation of the first rotary table and the X-position then assumed by the first tool spindle. In other words, the first tool spindle may be moved beyond the X-position of the axis of rotation of the second rotary table if required. The second tool spindle may be operated the other way round, such that it can be moved beyond the X-position of the axis of rotation of the first rotary table if required. The other tool spindle then moves out of the way.

According to a further exemplary embodiment, the workpiece table has at least one location for supporting at least one pallet, wherein, when two tool spindles are used, a first location is associated with the first tool spindle and a second location is associated with the second tool spindle. The pallet serves to support at least one workpiece, wherein the workpiece can be clamped outside the machine tool.

According to a further exemplary embodiment, a pallet changer is provided for the workpiece change, which can be coupled to the frame on a side facing away from the gantry. In this way, the workpiece change does not take place through the gantry. On the side facing away from the gantry, there are favorable installation space conditions, so that there is sufficient space for the pallet changer.

According to another exemplary embodiment, the pallet changer is provided with a mobile frame base, which is detachable from the frame of the machine tool. Accordingly, the pallet changer can be separated from the frame of the machine tool for loading or other purposes. In principle, it is also conceivable to load the pallet changer in its coupled state with the frame of the machine tool. This can be done manually, partially automated or fully automated.

According to a further exemplary embodiment, the pallet changer is configured to receive two pallets from two locations of the workpiece table and to deliver two pallets to the two locations of the workpiece table, wherein the pallet changer has a transfer unit, which can be pivoted about a vertical axis and has four coupling locations, which can each be coupled to a pallet in order to exchange pallets between the workpiece table and a loading position on the pallet changer. By way of example, the transfer unit is configured as a lift-and-swivel transfer unit.

In this way, the pallet changer can exchange both pallets of the workpiece carrier in one cycle. The movement takes place via the transfer unit, which can couple to the front of the pallets in order to lift them and swivel them by 180°, for example.

According to a further exemplary embodiment, the workpiece table is movable in the third direction (Y-direction) into a transfer position, wherein in the transfer position a transfer of pallets between the workpiece table and the pallet changer is enabled, and wherein the pallet changer is positionally fixed in the third direction when coupled to the frame. In other words, neither the pallet changer nor the transfer unit needs to be translationally moved in the Y-direction to exchange pallets. The pallet changer couples to the frame. Then the Y-axis of the workpiece carrier is used to move the pallets arranged there to the pallet changer's transfer unit.

According to another exemplary embodiment, the gantry defines an operator side of the machine tool, wherein the side of the frame facing away from the gantry defines a loading side. The term loading side refers, at least in exemplary embodiments, to the workpiece change. The tool change may be performed via the operator side, through the at least one magazine opening in the gantry.

According to a further exemplary embodiment, the gantry comprises at least one first gantry recess, through which the working space is accessible, and two magazine openings, through which at least two tool magazines are accessible. When using two magazine arrangements, each comprising two magazines offset from each other, it is also conceivable to form four magazine openings on the gantry. However, it is also conceivable to form one of the two magazine openings large enough so that both tool magazines of a magazine arrangement can extend at least partially into it.

According to another exemplary embodiment, the gantry further comprises two guide openings, through which an end face of longitudinal guides for moving the workpiece table in the third direction is accessible. This arrangement facilitates monitoring of the translational Y-drive and corresponding service/repair work. It will be understood that, according to further exemplary embodiments, the guide openings and the magazine openings may be formed by a common opening for the longitudinal guide and corresponding magazines. The guide openings and the magazine openings open up an area of the machine tool that is adjacent to the actual working space. Provided that partitions are formed between the working space and adjacent areas, separate openings facilitate the delimitation and the respective accessibility.

It is to be understood that the previously mentioned features of the present disclosure and those mentioned in the following may not only be used in the respectively indicated combination, but also in other combinations or as isolated features without leaving the spirit and scope of the present disclosure.

BRIEF DESCRIPTION OF THE DRAWINGS

Further features and advantages of the present disclosure are disclosed by the following description of a plurality of preferred embodiments, with reference to the drawings, wherein:

FIG. 7: is a further view of the machine tool according to FIG. 6 in an alternative state.

EMBODIMENTS

Figure 1:
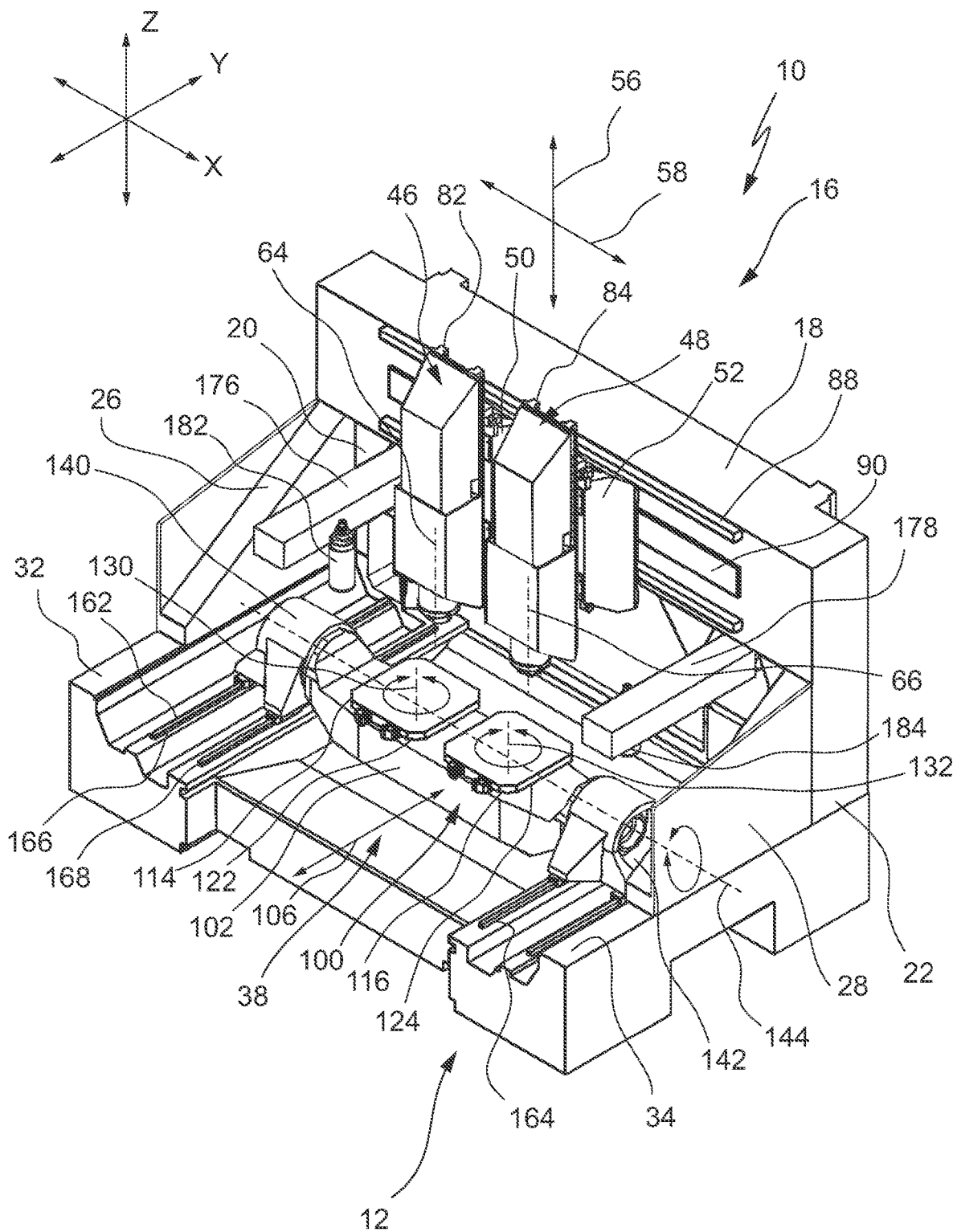
FIG. 1: is a perspective, simplified rear view of a machine tool.
Figure 2:
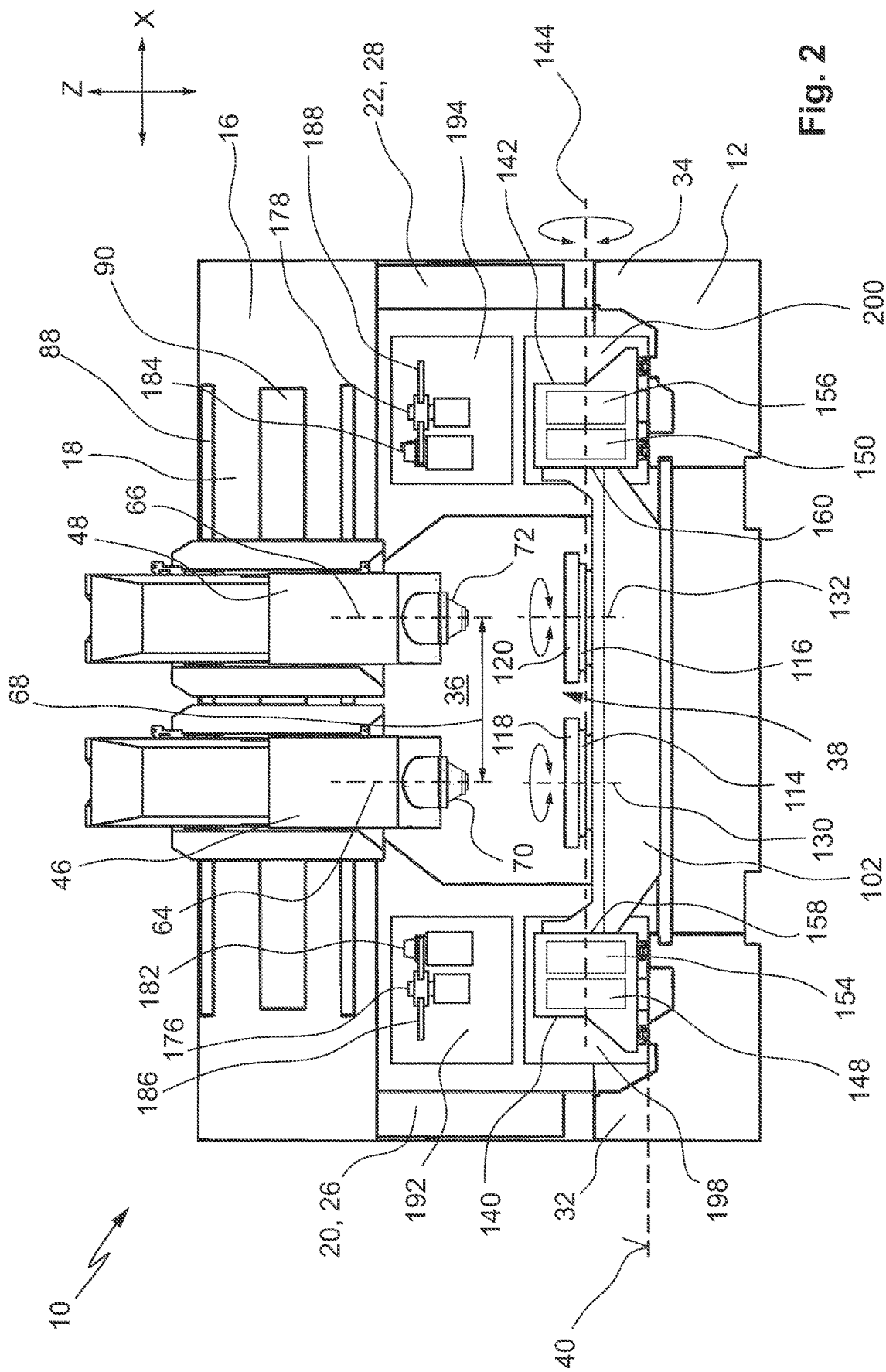
FIG. 2: is a rear, simplified view of the machine tool according to FIG. 1.
Figure 3:
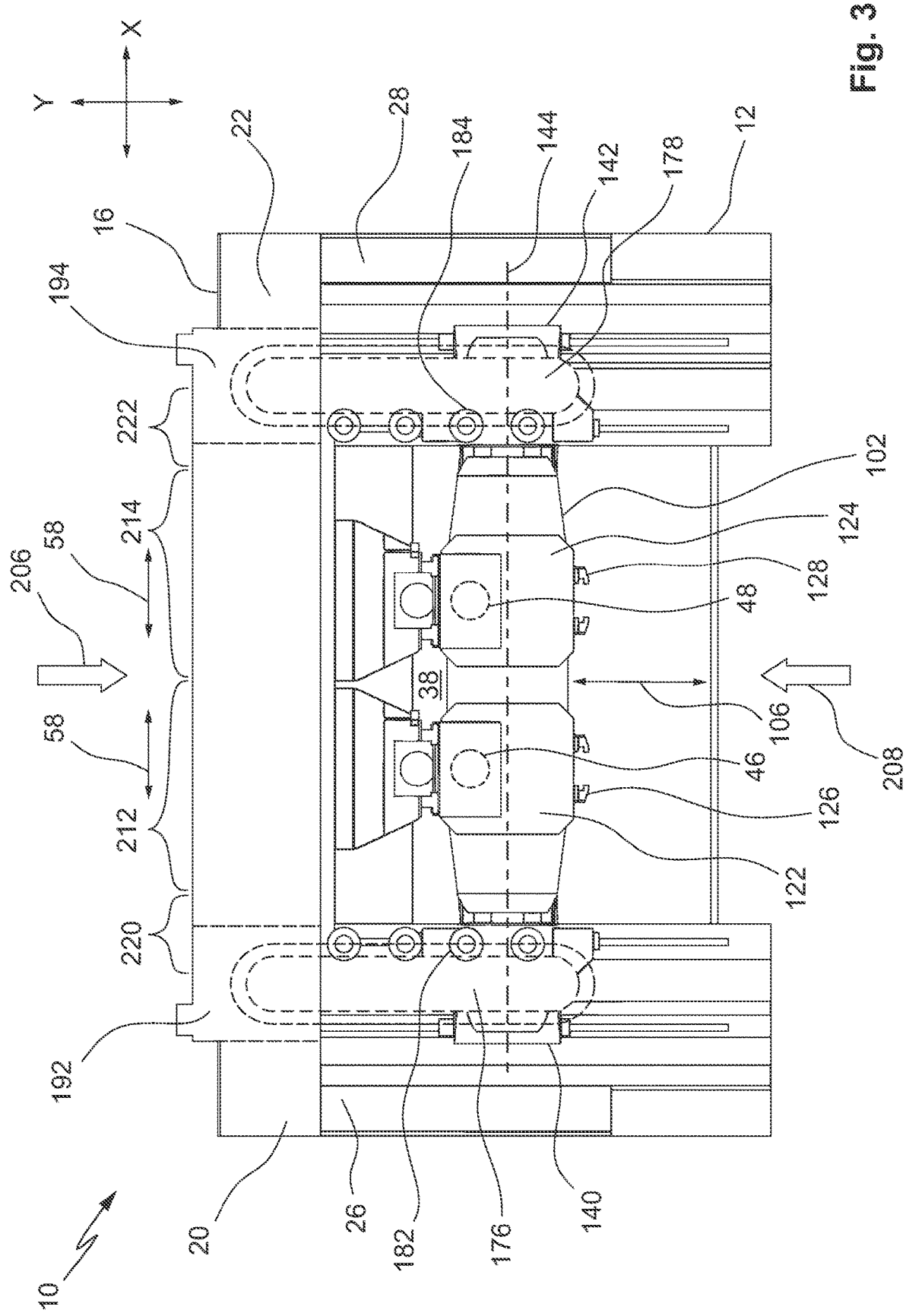
FIG. 3: is a simplified plan view of the machine tool illustrated in FIGS. 1 and 2.

FIG. 1, in connection with FIGS. 2 and 3, illustrates an exemplary embodiment of a machine tool, which is designated in its entirety by 10. The machine tool 10 comprises a frame 12 supporting a gantry 16. The gantry 16 includes a cross member 18 and side beams 20, 22. Side struts 26, 28 extend between the gantry 16 and the frame 12. The side struts 26, 28 connect a rear side (spindle side) of the gantry 16 and/or of its beams 20, 22 to elevated side profiles 32, 34 of the frame. A gantry recess 36 is formed on the gantry 16, through which a working space 38 is accessible. The gantry 16 delimits the working space 38.

In FIG. 2, a guide plane designated by 40 is indicated by a dashed line. The raised side profiles 32, 34 are raised relative to the guide plane 40. The side profiles 32, 34 stiffen the frame 12 and/or its base. The side struts 26, 28 provide a strong and rigid coupling between the side profiles 32, 34 and the gantry 16.

The gantry 16 supports a first tool spindle 46 and a second tool spindle 48. Accordingly, at least in the embodiment illustrated in FIGS. 1 to 3, the machine tool 10 is configured as a double spindle machine. The first tool spindle 46 is movable on a carriage 50 in a first direction 56 and, via the carriage 50, in a second direction 58. The second tool spindle 48 is movable on a carriage 52 in the first direction 56 and, via the carriage 52, in the second direction 58.

In FIG. 1, a Cartesian coordinate system X-Y-Z is shown for illustrative purposes. In the illustrated embodiment, the first direction 56 is parallel to the Z-axis. Further, the second direction 58 is parallel to the X-axis. A further, third direction (reference numeral 106) is parallel to the Y-axis. The Z-axis generally describes a vertical or height direction. The X-axis and the Y-axis generally describe horizontal axes oriented perpendicular to each other. Together, the X-axis and the Y-axis form a horizontal plane. The guide plane 40 (compare FIG. 2) is parallel to the X-Y horizontal plane.

It is understood that the coordinate system X-Y-Z and the axis designations and directions used herein are merely of exemplary nature and serve primarily illustrative purposes. They are therefore not to be understood to be limiting. It will therefore be understood that other coordinate systems and axis designations are also usable to describe the relationships between the components of the machine tool 10. The person skilled in the art may apply conceptual transformations to convert such coordinate systems into one another. Further, in the context of the present disclosure, ordinal numbers and/or enumerations (first, second, etc. elements) are used primarily for illustrative and distinguishing purposes and are therefore not to be understood in a limiting manner. Ordinal numbers do not necessarily imply a qualitative or quantitative order.

The first tool spindle 46 has a spindle axis 64 and a tool holder 70, which can be driven for rotation about the spindle axis 64, see also FIG. 2. The second tool spindle 48 has a spindle axis 66 and a tool holder 72, which can be driven in rotation about the spindle axis 66. The spindle axes 64, 66 result in a spindle distance 68 in the X-direction (second direction). In exemplary embodiments, the spindle spacing 68 is constant during machining so that the two tool spindles 46, 48 can be moved synchronously. In exemplary embodiments, this includes synchronous movement in the Z-direction (first direction). In this way, two workpieces can be machined simultaneously in an identical or nearly identical manner.

A Z-guide 82 extends between the tool spindle 46 and the carriage 50. A Z-guide 84 extends between the tool spindle 48 and the carriage 52. Both the carriage 50 and the carriage 52 are mounted on a guide 88 on the gantry 16, which extends in the X-direction (second direction). Furthermore, in FIG. 1 and FIG. 2 a primary part of a linear direct drive is indicated by 90. In the exemplary embodiment, the primary part 90 cooperates with corresponding secondary parts, one of which is arranged on the carriage 50 and one of which is arranged on the carriage 52. In this way, the tool spindles 46, 48 can be moved together and independently of each other in the second direction (X-direction) along the guide 88 at the gantry 16.

The machine tool 10 further comprises a workpiece table 100, which is arranged at least sectionally, for instance largely or completely, in the working space 38. In the exemplary embodiment according to FIGS. 1 to 3, the workpiece table 100 is configured as a cradle 102. The workpiece table 100 is translationally movable in a third direction 106 (Y-direction). The workpiece table 100 is configured to support workpieces. To this end, the workpiece table 100 exemplarily includes locations 114, 116, each of which forms a workpiece support. For example, the locations 114, 116 each comprise a rotatable rotary table 118, 120 for directly supporting workpieces or for supporting a pallet.

By way of example, the rotary tables 118, 120 each support a pallet 122, 124. The pallets 122, 124 function as workpiece carriers. The pallets 122, 124 may hold at least one workpiece that is secured to the pallet. Loading workpieces may comprise handling the pallets 122, 124, that is, loading the locations 114, 116 with pallets 122, 124, which are in turn loaded with workpieces. It will be understood that the machine tool 10 can in principle be operated without such pallets. Workpieces may be supported directly on the rotary tables 118, 120. Nevertheless, the pallets 122, 124 may facilitate an automated workpiece change. When the pallets 122, 124 are loaded with workpieces outside of the working space 38, non-productive times may be reduced. The pallets 122, 124 have coupling pieces 126, 128, compare FIG. 3. Via the coupling pieces 126, 128, a pallet changer can engage the pallets 122, 124 for handling them.

The rotary tables 118, 120 are pivotable and/or rotatable about axes 130, 132. The axes 130, 132 are also referred to as C-axes. In the orientation of the workpiece table 100 (the cradle 102) shown in FIG. 1, the axes 130, 132 are oriented parallel to the Z-axis. However, this orientation is dependent on the current pivot orientation of the workpiece table 100 with respect to the X-axis. The workpiece table 100 is mounted on a first carriage 140 and a second carriage 142. The carriages 140, 142 further define a pivot axis 144, which is also referred to as A-axis. The A-axis is parallel to the X-axis. The workpiece table 100 and consequently the rotary tables 118, 120 are pivotable about the A-axis. In the exemplary embodiment, the distance between the two C-axes 130, 132 corresponds to the selected spindle distance 68 between the two spindle axes 64, 66, at least in an exemplary operating mode for simultaneous machining of two workpieces.

In FIG. 2, blocks 148, 150 illustrate two translational drives for the workpiece table 100 for movement in the third direction 106 (Y-direction). By way of example, the carriages 140, 142 accommodate the drives 148, 150. This is conceivable, for example, with a direct drive or linear direct drive. However, it is also conceivable to make the carriages 140, 142 movable in the third direction 106 via screw drives (spindle drives) or the like. In certain embodiments, it is essential that each of the two carriages 140, 142 is assigned its own separate drive 148, 150. Accordingly, the workpiece table 100 is movable in the Y-direction according to the moving gantry principle. Via a suitable control of the two drives 148, 150, both carriages 140, 142 can be moved with high precision and in synchronism. In certain embodiments, the workpiece table 100, which is configured as a cradle 102, can be moved precisely in the Y-direction despite its considerable extension in the X-direction, while maintaining a desired degree of parallelism between the A-axis 144 and the X-direction. Further, in at least exemplary embodiments, high accelerations and travel speeds can be achieved with the two drives 148, 150.

The carriages 140, 142 also each accommodate a swivel drive 154, 156 as well as a pivot bearing 158, 160 for the swivel movement of the workpiece table 100, which is arranged as a cradle 102, about the swivel axis 144. Thus, two fundamentally independent drives, which are controlled synchronously, are also available for this degree of freedom. This configuration also contributes to the fact that, despite the considerable X-extension of the workpiece table 100 between the two carriages 140, 142, a highly precise movement and consequently a precise machining is possible. The two swivel drives 154, 156 allow high angular accelerations and angular velocities, at least in exemplary embodiments.

The carriages 140, 142 are each mounted on a longitudinal guide 162, 164 extending in the Y-direction. The longitudinal guides 162, 164 include guide rails 166, 168. The frame 12 supports the longitudinal guides 162, 164. The longitudinal guides 162, 164 are disposed within the side profiles 32, 34 of the frame. The longitudinal guides 162, 164 are adjacent the side profiles 32, 34.

In FIG. 1, two blocks designated by 176, 178 illustrate tool magazines for providing machining tools. The tool magazines 176, 178 are further detailed in FIGS. 2 and 3 with reference to schematic illustrations. The tool magazine 176 is associated with the first tool spindle 46. The tool magazine 178 is associated with the second tool spindle 48. The tool magazine 176 carries tool locations 182, 186 (FIG. 2). The tool magazine 178 carries tool locations 184, 188. The locations 182, 184, 186, 188 may be empty locations for supporting a tool from the tool spindles 46, 48 or locations loaded with tools for delivery to the tool holders 70, 72 of the tool spindles 46, 48.

The tool magazines 176, 178 are exemplarily configured as chain magazines, for instance as circulating chain magazines. Accordingly, suitable drives are provided for the tool magazines 176, 178. The tool magazines 176, 178 extend at least partially into magazine openings 192, 194 in the gantry 16, compare also FIG. 2 and FIG. 3. In this way, the tool magazines 176, 178 can be loaded from the side of the gantry 16 facing away from the working space 38. In exemplary embodiments, the tool magazines 176, 178 may extend outwardly through the magazine openings 192, 194.

According to another exemplary embodiment, the gantry 16 further comprises guide openings 198, 200, compare again FIG. 2. In the embodiment shown there, the guide openings 198, 200 are arranged below the magazine openings 192, 194 as seen from the frame 12. Through the guide openings 198, 200, an end face of the longitudinal guides 162, 164 and/or of their guide rails 166, 168 is accessible. In this way, this area including the carriages 140, 142 can be monitored, and furthermore maintenance work, inspection work and the like are simplified.

The work area 38 is accessible and visible through the central gantry recess 36. However, at least in exemplary embodiments, it is not intended to accomplish a workpiece change through the gantry recess 36. Instead, the workpiece change may be accomplished through the opposite side of the frame 12. Accordingly, the side of the machine tool 10 formed by the gantry 16 may be referred to as the operator side 206 and the side of the frame 12 facing away therefrom may be referred to as the loading side 208, at least in the example embodiment shown in FIG. 3.

At least in an exemplary embodiment, the tool change between the tool spindles 46, 48 and the tool magazines 176, 178 is performed without additional handling technology in the form of grippers, transfer units, robots, and similar mechanisms. Instead, the tool spindles 46, 48 are configured to perform a tool change using a pick-up process. To this end, the tool magazines 176, 178 are configured to provide vertical accessibility for the tool spindles 46, 48.

The tool spindles 46, 48 are not movable in the third direction (Y-direction). However, the tool magazines 176, 178, which are exemplarily configured as chain magazines, can be driven in such a way that a currently desired tool location 182, 184 can be provided in the required Y-position. However, the tool spindles 46, 48 are movable in the first direction (vertical) and the second direction (horizontal). In this way, for example, the first tool spindle 46 can move from its primary work area 212 (compare FIG. 3) in the X-direction into a tool change area 220 associated with the tool magazine 176 to assume a tool change position. Similarly, the second tool spindle 48 can move from its primary work area 214 in the X-direction into a tool change area 222 associated with the tool magazine 178 and assume a tool change position there. In the tool change position, the tool spindles 46, 48 may be moved vertically in the Z-direction to receive tools from and/or deliver tools to the tool locations 182, 184.

For the tool change, the two tool spindles 46, 48 leave their "forced coupling" with constant spindle distance 68. In certain embodiments, the two tool spindles can be moved separately and independently of each other. If desired tools are mounted at the tool receptacles 70, 72, synchronous machining can in turn be performed as required in the control-coupled state with constant spindle distance 68.

By way of example, FIGS. 2 and 3 illustrate that the tool magazines 176, 178 are arranged above (i.e., similar X-position, similar Y-position, different Z-position) the longitudinal guides 162, 164 of the workpiece table 100. This results in a favorable configuration of the working space 38, since it is not obstructed by the tool magazines 176, 178 and also not obstructed by the longitudinal guides 162, 164 and/or the carriages 140, 142. In certain embodiments, the transfer of the tools during the tool change takes place outside the working space 38 in the tool change area 220, 222 delimited therefrom. In principle, it is conceivable to provide partition walls between the working space 38 and the tool change area 220, 222.

Figure 4:
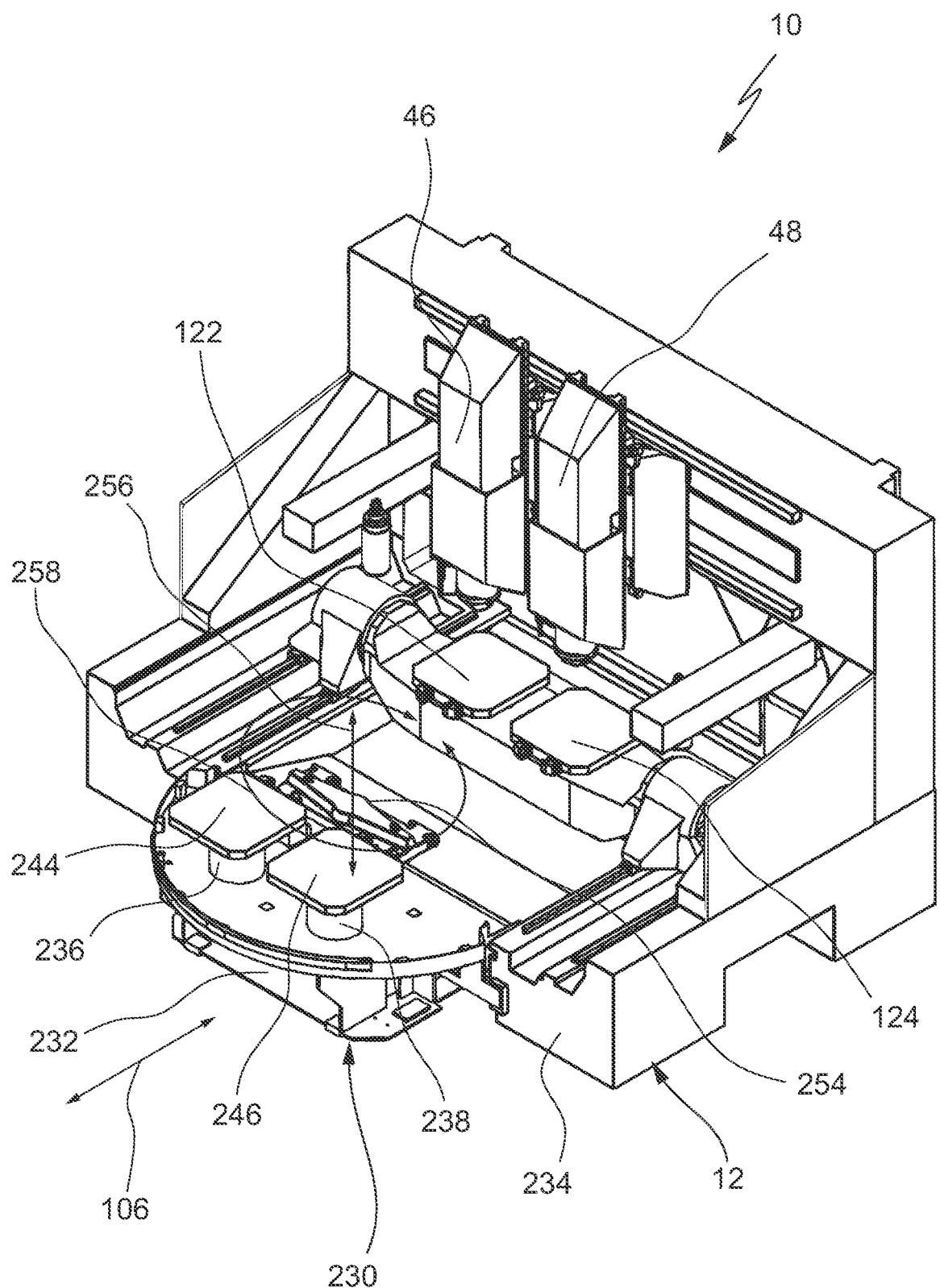
FIG. 4: is a perspective view of a machine tool similar to FIG. 1, with a pallet changer.
Figure 5:
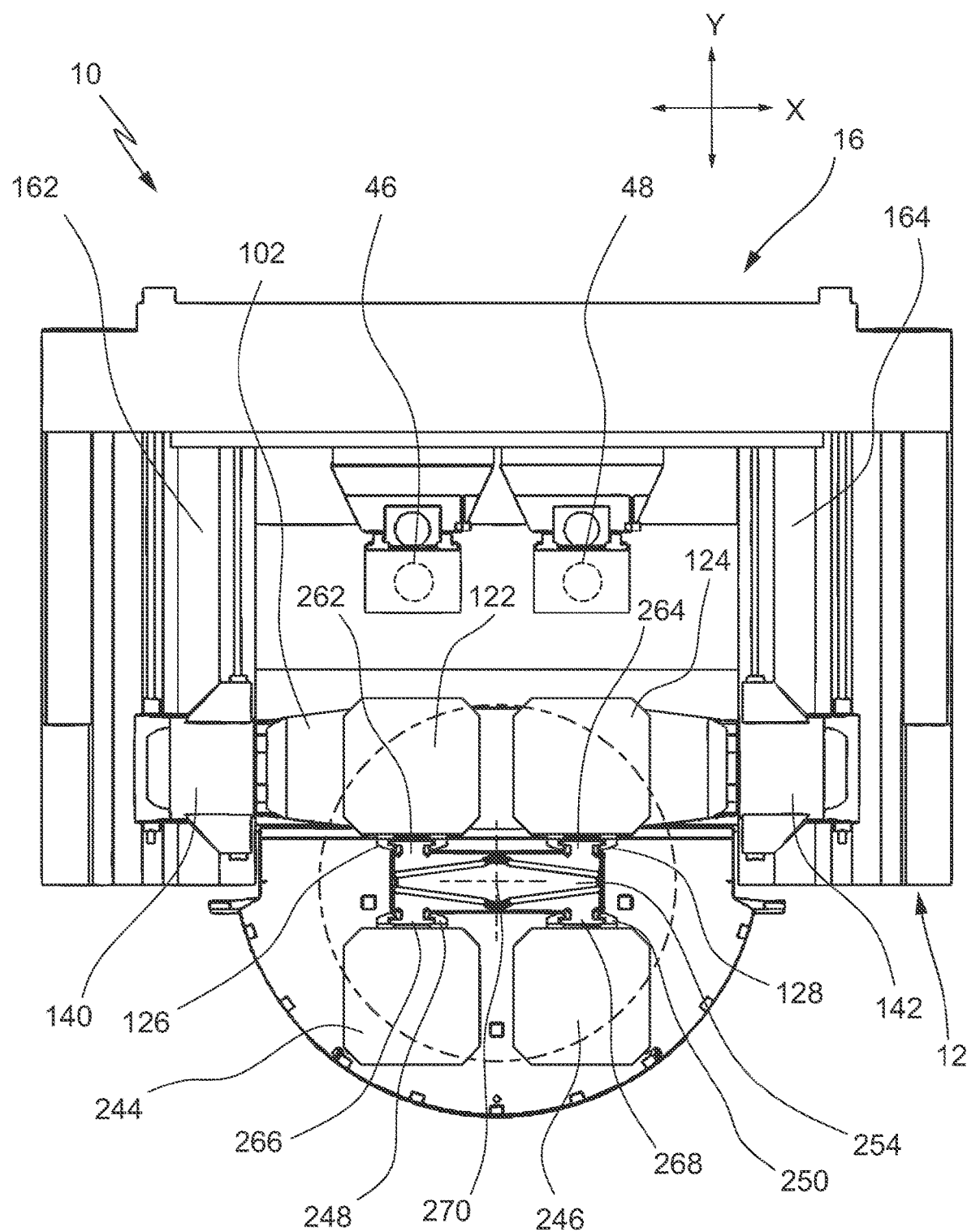
FIG. 5: is a simplified top view of the machine tool according to FIG. 4.

With reference to FIG. 4 and FIG. 5, an exemplary embodiment with automated workpiece change is illustrated based on the configuration of the machine tool 10 already elucidated with reference to FIGS. 1 to 3. For the workpiece change, a pallet changer 230 is provided, which can be coupled to and/or moved towards the loading side 208 (compare also FIG. 3) of the frame 12.

The pallet changer 230 includes a frame base 232 that can be moved toward an end face 234 of the frame 12 in the third direction (Y-direction). Accordingly, the frame base 232 may comprise a chassis or guide units for Y movement. In an exemplary embodiment, the pallet changer 230 includes two locations 236, 238 that support pallets 244, 246 for pallet exchange. Accordingly, the pallets 244, 246 may be loaded with workpieces that are yet to be processed. The pallets 244, 246 correspond generally to the previously elucidated pallets 122, 124 on the workpiece table 100. The pallets 122, 124 and the pallets 244, 246 are interchangeable for workpiece exchange. The pallets 122, 124, 244, 246 each have a coupling piece 126, 128, 248, 250 on one of their end faces, which can be engaged by the pallet changer 230.

For the actual exchange movement (exchange of the pallets 122, 124 with the pallets 244, 246), it is not necessary to move the frame base 232 of the pallet changer 230 in the third direction (Y-direction) relative to the frame 12 of the machine tool 10. Instead, the workpiece table 100 can move in the Y-direction to a workpiece exchange position, in which the workpiece table 100 is adjacent to the pallet changer 230, compare FIG. 4. For the exchange, the pallet changer 230 includes a transfer unit 254 that can perform a combined lifting and swiveling movement, by way of example. In FIG. 4, the double arrow 256 illustrates the lifting movement (in the Z-direction). In contrast, the curved double arrow 258 illustrates the swiveling movement (about the Z-axis).

The transfer unit 254 has a total of four coupling locations 262, 264, 266, 268 so that a total of four pallets 122, 124, 244, 246 can be gripped and transferred by the transfer unit 254 via their coupling pieces 126, 128, 248, 250. By way of example, the pallets 122, 124, 244, 246 are lifted (Z-movement) by the transfer unit 254 and rotated 180° about the pivot axis 270 (compare FIG. 5) of the transfer unit 254. In this way, an exchange of the pallets 122, 124 with the pallets 244, 246 takes place.

Figure 6:
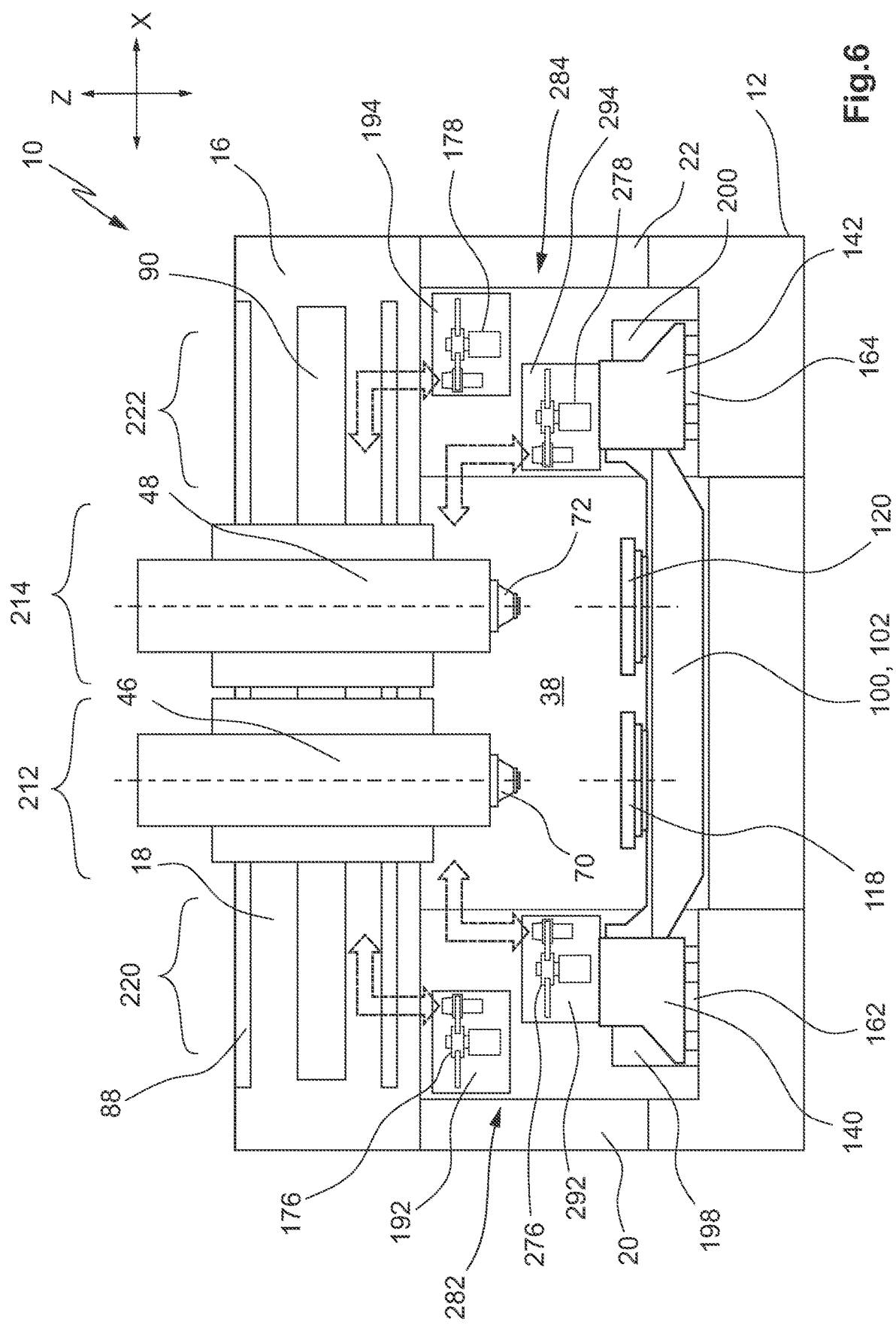
FIG. 6: is a rear, simplified view of a further embodiment of a machine tool.

With reference to FIG. 6 and FIG. 7, a further embodiment of a machine tool 10 is illustrated, which largely corresponds to the embodiment according to FIGS. 1 to 3. A modification is present in the configuration of the magazines for the tool change.

In a manner basically described hereinbefore, a first tool magazine 176 is associated with the first spindle 46 and a second tool magazine 178 is associated with the second spindle 48. However, the tool magazines 176, 178 are each associated with a magazine arrangement 282, 284. In addition to the tool magazine 176, the magazine arrangement 282 comprises a further tool magazine 276. In addition to the tool magazine 178, the magazine arrangement 284 comprises a further tool magazine 278. Similarly to the tool magazines 176, 178, the tool magazines 276, 278 comprise tool locations for providing or supporting tools.

The tool magazines 176, 178, 276, 278 are configured such that the first tool spindle 46 can approach both the tool magazine 176 and the tool magazine 276 to change tools therein using the pick-up process. Similarly, the second tool spindle can approach both the tool magazine 178 and the tool magazine 278 to change tools there using the pick-up process.

Since the tool spindles 46, 48 are not movable in the third direction (Y-direction), the two tool magazines 176, 276 of the magazine arrangement 282 as well as the two tool magazines 178, 278 of the magazine arrangement 284 are each offset from each other in the X-direction (second direction). The offset is adapted to the dimensions of the tool spindles 46, 48 so that tool locations of the tool magazines 176, 178, 276, 278 are accessible vertically (in the Z-direction) for the respectively associated tool spindle 46, 48. The respective lower tool magazine 276, 278, seen from the frame 12, is slightly offset with respect to the respective upper tool magazine 176, 178 in the direction towards the working area.

Furthermore, in addition to the magazine openings 192, 194 in the gantry 36 for the tool magazines 176, 178 already described, the embodiment illustrated with reference to FIGS. 6 and 7 has further magazine openings 292, 294, which allow access to the tool magazines 276, 278 from the operator side 206 (FIG. 3) through the gantry 16. It will be understood that the magazine openings 192, 292 as well as the magazine openings 194, 294 can in principle also be combined and thus each also form a common magazine opening for both magazines of the respective magazine arrangement 282, 284. Furthermore, FIGS. 6 and 7 also show the previously described guide openings 198, 200 at the gantry 16. Overall, therefore, good accessibility to the tool magazines 176, 178, 276, 278 and the carriages 140, 142 and/or the longitudinal guides 162, 164 from the operator side 206 is provided.

In this way, there is no need to change tools through the gantry recess 36. Accordingly, the tool change area 220, 222 may be separated from the work area 38 by walls or the like. The tool spindles 46, 48 are configured as pick-up spindles and can bypass or otherwise overcome such walls.

FIG. 7, in combination with FIG. 6, illustrates another exemplary feature of the machine tool 10. Basically, the other configurations according to FIGS. 1 to 5 may also comprise this function.

FIG. 6 illustrates a normal operating mode, in which the first tool spindle 46 is disposed in its primary work area 212 and consequently associated with the first rotary table 118 for machining workpieces there. Similarly, the second tool spindle 48 is disposed in its primary work area 214 and consequently associated with the second rotary table 120 for machining workpieces there.

Starting from this normal operating mode, FIG. 7 illustrates an operating mode, in which one of the two tool spindles can be operated "crosswise". By way of example, in FIG. 7 the second tool spindle 48 is arranged in the tool change area 222. In principle, this can also relate to a parking position or service position.

There is now sufficient space in the second direction (X-direction) on the member 18 of the gantry 16 so that the first tool spindle 46 can now leave its original primary work area 212 (compare FIG. 6). In FIG. 7, the first tool spindle 46 is located in a secondary work area 302, in which the first tool spindle 46 is associated with the second rotary table 120 in order to machine workpieces there. It will be understood that the second tool spindle 48 cannot simultaneously be located in its secondary work area 304 associated with the first rotary table 118. However, this would be possible if the first tool spindle 46 is located in the tool change area 220.

The invention claimed is:

1. A machine tool, comprising:
   a frame;
   a first tool spindle and a second tool spindle;
   a fixed gantry, which is supported by the frame, for supporting the first tool spindle and the second tool spindle, wherein a gantry recess is formed in the gantry through which a working space is accessible;
   a workpiece table having at least one workpiece support location for supporting workpieces;
   a first tool magazine that corresponds to the first tool spindle, and a second tool magazine that corresponds to the second tool spindle;
   wherein, on the gantry, the first tool spindle and the second tool spindle can each be moved vertically in a first direction and horizontally in a second direction which is orthogonal to the first direction, wherein the workpiece table is horizontally movable in a third direction orthogonal to the first direction and to the second direction, wherein the workpiece table is guided for movement in the third direction by a first longitudinal guide supported by the frame and by a second longitudinal guide supported by the frame, wherein a first magazine opening is formed in the gantry and a second magazine opening is formed in the gantry, the first magazine opening and the second magazine opening being separated from one another in the second direction and being distinct from both one another and the gantry recess, wherein a first end of the first tool magazine extends at least partially into the gantry within the first magazine opening, and wherein a second end of the first tool magazine, the second end being disposed opposite the first end of the first tool magazine, is located above the first longitudinal guide such that a first virtual vertical line intersects both the second end of the first tool magazine and the first longitudinal guide, and wherein a first end of the second tool magazine extends at least partially into the gantry within the second magazine opening, and wherein a second end of the second tool magazine, the second end being disposed opposite the first end of the second tool magazine, is located above the second longitudinal guide such that a second virtual vertical line intersects both the second end of the second tool magazine and the second longitudinal guide.

2. The machine tool of claim 1,
wherein the workpiece table is pivotable about an axis that extends parallel to the second direction,
wherein two mutually spaced, jointly controlled drives are provided for the movement of the workpiece table in the third direction, and
wherein two mutually spaced, jointly controlled swivel drives are provided for a pivoting movement of the workpiece table about the axis that extends parallel to the second direction.

3. The machine tool of claim 1,
wherein the workpiece table comprises a first workpiece support location, which is associated with the first tool spindle, and a second workpiece support location, which is associated with the second tool spindle.

4. The machine tool of claim 3,
wherein the first tool spindle and the second tool spindle are movable together and synchronously in the second direction, and
wherein a spindle distance is adapted to a distance between the first workpiece support location and the second workpiece support location.

5. The machine tool of claim 3,
wherein the workpiece table comprises two mutually offset and driven rotary tables, the axes of rotation of which being perpendicular to a pivot axis of the workpiece table, and
wherein the first tool spindle is associated with a first rotary table of the two mutually offset and driven rotary tables and the second tool spindle is associated with a second rotary table of the two mutually offset and driven rotary tables.

6. The machine tool of claim 5,
wherein the first tool spindle and the second tool spindle are movable in the second direction on the gantry in such a way that:

the first tool spindle, departing from a primary working position associated with the first rotary table, is movable towards the second rotary table into a secondary working position, when the second tool spindle is moved away from the second rotary table, and the second tool spindle, departing from a primary working position associated with the second rotary table, is movable towards the first rotary table into a secondary working position, when the first tool spindle is moved away from the first rotary table.

7. The machine tool of claim 1,
wherein the first tool magazine is located in a first tool change area outside the working space, and
wherein the first tool spindle is movable between a working position in the working space and a tool changing position in the first tool change area.

8. The machine tool of claim 7,
wherein the first tool magazine is arranged in the first tool change area and the second tool magazine is arranged in a second tool change area, and
wherein the working area is arranged between the first tool change area and the second tool change area.

9. The machine tool of claim 8,
wherein the first tool spindle and the second tool spindle are movable independently of one another in the second direction for tool changing,
wherein the first tool spindle is movable between the working area and the first tool change area, and
wherein the second tool spindle is movable between the working area and the second tool change area.

10. The machine tool of claim 7,
wherein the first tool spindle is vertically movable in the first tool change area to change a machining tool, and
wherein at least one tool location of the first tool magazine is vertically accessible from above for the first tool spindle.

11. The machine tool of claim 1,
wherein the first tool magazine is configured as a first tool chain magazine, and
wherein the second tool magazine is configured as a second tool chain magazine.

12. The machine tool of claim 1,
wherein the first tool magazine, together with a further tool magazine that is arranged in a same tool change area as the first tool magazine, forms a magazine arrangement with two offset magazines, the two offset magazines being offset from one another in such a way that each of the two offset magazines of the magazine arrangement is accessible for the first tool spindle from above.

13. The machine tool of claim 12,
wherein the two offset magazines comprises, with respect to the working space, an upper magazine and a lower magazine, and
wherein the lower magazine is offset from the upper magazine in a direction towards the working space.

14. The machine tool of claim 1,
wherein the workpiece table has at least one location for supporting at least one pallet.

15. The machine tool of claim 14,
wherein for a workpiece change a pallet changer is provided, the pallet changer being arranged to be coupled to the frame on a side facing away from the gantry.

16. The machine tool of claim 15,
wherein the workpiece table has two locations, each for supporting a respective pallet, wherein the pallet changer is configured to receive two pallets from the two locations of the workpiece table and to deliver two pallets to the two locations of the workpiece table, and wherein the pallet changer has a transfer unit, which can be pivoted about a vertical axis and has four coupling locations, which are each arranged to be coupled to a pallet to exchange the pallet between the workpiece table and a loading position on the pallet changer.

17. The machine tool of claim 15, wherein the workpiece table is movable in the third direction into a transfer position, wherein in the transfer position a transfer of pallets between the workpiece table and the pallet changer is enabled, and wherein the pallet changer is positionally fixed in the third direction in a state coupled to the frame.

18. The machine tool of claim 1, wherein the gantry defines an operator side of the machine tool, and wherein a side of the frame facing away from the gantry defines a loading side.

19. The machine tool of claim 18, wherein the first tool magazine is accessible through the first magazine opening, and wherein the second tool magazine is accessible through the second magazine opening.

20. The machine tool of claim 19, wherein the gantry further comprises a first guide opening, through which an end face of the first longitudinal guide for moving the workpiece table in the third direction is accessible, and wherein the gantry further comprises a second guide opening, through which an end face of the second longitudinal guide for moving the workpiece table in the third direction is accessible.

21. A machine tool, comprising:

a frame;

a first tool spindle and a second tool spindle;

a gantry, which is supported by the frame, for supporting the first tool spindle and the second tool spindle, wherein a gantry recess is formed in the gantry through which a working space is accessible;

a workpiece table having at least one workpiece support location for supporting workpieces;

a first tool magazine that corresponds to the first tool spindle, and a second tool magazine that corresponds to the second tool spindle;

wherein, on the gantry, the first tool spindle and the second tool spindle can each be moved vertically in a first direction and horizontally in a second direction which is orthogonal to the first direction, wherein the workpiece table is horizontally movable in a third direction orthogonal to the first direction and to the second direction, wherein the workpiece table is guided for movement in the third direction by a first longitudinal guide supported by the frame and by a second longitudinal guide supported by the frame, wherein a first magazine opening is formed in the gantry and a second magazine opening is formed in the gantry, the first magazine opening and the second magazine opening being separated from one another in the second direction and being distinct from both one another and the gantry recess, wherein a first end of the first tool magazine extends at least partially into the gantry within the first magazine opening, and wherein a second end of the first tool magazine, the second end being disposed opposite the first end of the first tool magazine, is located above the first longitudinal guide such that a first virtual vertical line intersects the second end of the first tool magazine and the first longitudinal guide, wherein a first end of the second tool magazine extends at least partially into the gantry within the second magazine opening, and wherein a second end of the second tool magazine, the second end being disposed opposite the first end of the second tool magazine, is located above the second longitudinal guide such that a second virtual vertical line intersects the second end of the second tool magazine and the second longitudinal guide, and wherein the workpiece table is pivotable about an axis that extends parallel to the second direction.

22. The machine tool of claim 21, wherein two drives for the movement of the workpiece table in the third direction are synchronously controlled, and wherein two drives for a pivot movement of the workpiece table are synchronously controlled.

23. The machine tool of claim 21, wherein the workpiece table is mounted at a first pivot bearing and at a second pivot bearing spaced that is spaced from the first pivot bearing and the workpiece table extends therebetween as a cradle, and wherein a first swivel drive is associated with the first pivot bearing and a second swivel drive is associated with the second pivot bearing.

24. The machine tool of claim 21, wherein the workpiece table is mounted on and extends between the first longitudinal guide and the second longitudinal guide, and wherein a first linear actuator is associated with the first longitudinal guide and a second linear actuator is associated with the second longitudinal guide.

25. The machine tool of claim 24, wherein two side struts extend between the gantry and the frame, and wherein the first longitudinal guide and the second longitudinal guide for the workpiece table are arranged between the two side struts.

26. The machine tool of claim 25, wherein each of the two side struts has a respective first node with a spindle side of the gantry and has a respective second node with a support side of the frame.

27. The machine tool of claim 25, wherein each of the two side struts couples to the frame at a respective raised side profile thereof.

28. The machine tool of claim 27, wherein the frame comprises two raised side profiles, each of which are raised relative to guide rails of the first and second longitudinal guides on the frame.

* * * * *